US012787912B2

(12) United States Patent
Ullrich et al.

(10) Patent No.: US 12,787,912 B2
(45) Date of Patent: Nov. 10, 2026

(54) AUTONOMOUS MOBILE OUTDOOR GROUND TREATMENT ROBOT

(71) Applicant: Andreas Stihl AG & Co. KG, Waiblingen (DE)

(72) Inventors: Martin Ullrich, Fellbach (DE); Sven Keller, Berglen (DE); Martin Failenschmid, Engstingen (DE); Jakob Eberharter, Innsbruck (AT); Goetz Wintergerst, Stuttgart (DE); Philipp Mueller, Osterburken (DE); Alberto Bellato, Axams (AT); Julian Daubermann, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 1028 days.

(21) Appl. No.: 17/889,974

(22) Filed: Aug. 17, 2022

(65) Prior Publication Data

US 2023/0059756 A1 Feb. 23, 2023

(30) Foreign Application Priority Data

Aug. 17, 2021 (EP) .................................... 21191790

(51) Int. Cl.
*A01D 34/00* (2006.01)
*A01D 34/81* (2006.01)
(Continued)

(52) U.S. Cl.
CPC ......... *A01D 34/008* (2013.01); *A01D 34/001* (2013.01); *A01D 34/81* (2013.01);
(Continued)

(58) Field of Classification Search
CPC ........ B60K 35/00; B60K 35/10; B60K 35/22; B60K 35/28; B60K 35/80; A01D 34/001; A01D 34/008; A01D 34/81
See application file for complete search history.

(56) References Cited

U.S. PATENT DOCUMENTS 5,392,081 A 2/1995 Tarnay et al.
9,950,621 B2 4/2018 Dwyer
(Continued)

FOREIGN PATENT DOCUMENTS

CN 101944308 A 1/2011
CN 107134251 A 9/2017
(Continued)

OTHER PUBLICATIONS

German-language European Search Report issued in European Application No. 21191790.1 dated Feb. 10, 2022 with English translation (13 pages).
(Continued)

*Primary Examiner* — Thomas M Sember
(74) *Attorney, Agent, or Firm* — Crowell & Moring LLP

(57) ABSTRACT

An autonomous mobile outdoor ground treatment robot includes an at least upper-side outer contour and a display screen device. The at least upper-side outer contour includes a contour face in a plan view of the outdoor ground treatment robot. The display screen device comprises a display screen face. The size of the display screen face in plan view of the outdoor ground treatment robot is at least 5% of a size of the contour face.

12 Claims, 5 Drawing Sheets

(51) Int. Cl.

| | |
|---|---|
| ***B60K 35/10*** | (2024.01) |
| ***B60K 35/22*** | (2024.01) |
| ***B60K 35/28*** | (2024.01) |
| ***B60K 35/80*** | (2024.01) |
| *A01D 101/00* | (2006.01) |

(52) U.S. Cl.

CPC .............. *B60K 35/10* (2024.01); *B60K 35/22* (2024.01); *B60K 35/28* (2024.01); *B60K 35/80* (2024.01); *A01D 2101/00* (2013.01); *B60K 2360/33* (2024.01)

(56) References Cited

U.S. PATENT DOCUMENTS

| | | | |
|---|---|---|---|
| 10,272,828 B2 | 4/2019 | White et al. | |
| 12,262,587 B2 | 3/2025 | Yang et al. | |
| 2013/0278093 A1 | 10/2013 | Baxter | |
| 2016/0081526 A1* | 3/2016 | Gottinger ............ | A47L 11/4066 180/89.1 |
| 2018/0299902 A1 | 10/2018 | Hillen | |
| 2018/0352730 A1 | 12/2018 | Gorenflo et al. | |
| 2019/0223376 A1* | 7/2019 | Lee ........................ | B25J 13/088 |
| 2019/0307064 A1 | 10/2019 | Hong et al. | |

FOREIGN PATENT DOCUMENTS

| | | | |
|---|---|---|---|
| CN | 111867342 | A | 10/2020 |
| CN | 112514631 | A | 3/2021 |
| DE | 10 2011 000 816 | A1 | 8/2012 |
| DE | 10 2017 104 690 | A1 | 9/2018 |
| DE | 10 2017 108 194 | A1 | 10/2018 |
| EP | 3 355 147 | A1 | 8/2018 |
| EP | 3 412 130 | A1 | 12/2018 |
| EP | 3 549 425 | A1 | 10/2019 |

OTHER PUBLICATIONS

Chinese-language Office Action issued in Chinese Application No. 202210985217.7 dated Jan. 21, 2026 with English translation (19 pages).

German-language Extended European Search Report issued in European Application No. 25226486.6 dated Mar. 19, 2026 with partial English translation (12 pages).

Chinese-language Office Action issued in Chinese Application No. 202210985217.7 dated Jul. 2, 2026 with English translation (25 pages).

* cited by examiner

AUTONOMOUS MOBILE OUTDOOR GROUND TREATMENT ROBOT

CROSS REFERENCE TO RELATED APPLICATION

This application claims priority under 35 U.S.C. § 119 from European Patent Application No. 21191790.1, filed Aug. 17, 2021, the entire disclosure of which is herein expressly incorporated by reference.

BACKGROUND AND SUMMARY OF THE INVENTION

The invention relates to an autonomous mobile outdoor ground treatment robot.

The object of the invention is to provide an autonomous mobile outdoor ground treatment robot which has improved properties, and in particular allows a high level of user-friendliness.

The invention achieves this object by providing an autonomous mobile outdoor ground treatment robot having the features of claim 1. Advantageous refinements and/or configurations of the invention are described in the dependent claims.

The autonomous mobile outdoor ground treatment robot according to the invention comprises an at least upper-side outer contour and a display screen device. The outer contour defines or comprises a contour face in a plan view of the outdoor ground treatment robot. The display screen device defines or comprises a display screen face, particularly in the plan view of the outdoor ground treatment robot. A size of the display screen face, particularly in the plan view of the outdoor ground treatment robot, is or occupies at least 5% (percent), in particular at least 7.5%, of a size of the contour face.

This, in particular the size of the display screen face, allows a user of the outdoor ground treatment robot to be able to see the display screen face well, particularly under a bush and/or in the open and/or at a distance, for example from a patio. It therefore allows a high level of user-friendliness.

In particular, autonomous mobile outdoor ground treatment robot may mean that the outdoor ground treatment robot can be configured to move automatically or by itself or under its own control and/or independently of the user, in particular over a working area which may be predetermined and/or delimited, and/or to treat in particular the working area, in particular to start and/or end the processing or the treatment automatically or by itself or under its own control and/or independently of the user.

The outdoor ground treatment robot may be an open-air or outside and/or green area ground treatment robot and/or garden treatment equipment and/or electrical.

The working area may be an open area, in particular unsealed soil, or a green area such as a meadow with grass. Furthermore, the working area may also be an area with flagstones, paving slabs and/or cobblestones.

The outdoor ground treatment robot, in particular a treatment tool of the outdoor ground treatment robot, may be configured for treatment or operation over the working area. In particular, the treatment tool may comprise, in particular be, a cutting tool. In addition or as an alternative, the treatment tool may comprise, in particular be, a cleaning tool, in particular a wire brush.

The outdoor ground treatment robot may comprise a frame, in particular comprising running wheels, in particular for travelling movement of the outdoor ground treatment robot over the working area. In particular, the frame, in particular the running wheels of the frame, may comprise or define a travelling plane. In particular, upper-side may mean on an opposite side of the outdoor ground treatment robot from the travelling plane. In addition or as an alternative, the term "underbody" or "chassis" may be used synonymously for the term "frame".

The at least upper-side outer contour may comprise an at least upper-side cover, or be formed at least partially, in particular entirely, by the cover. In addition or as an alternative, the outer contour, in particular the cover, may define an in particular covered and/or flat ground or base face. In particular, upper-side may mean on an opposite side of the outdoor ground treatment robot from the ground face. In addition or as an alternative, the cover may be a cover hood and/or allow protection of the outdoor ground treatment robot, in particular of the frame and/or of the display screen device. In particular, the term "protective hood" may be used synonymously for the term "cover hood". Furthermore in addition or as an alternative, the outer contour, in particular the cover, may cover the frame at least partially, in particular entirely. Furthermore in addition or as an alternative, the outer contour, in particular the cover, and/or the frame may cover the treatment tool at least partially, in particular entirely. Furthermore in addition or as an alternative, the treatment tool may be arranged below the frame and/or above the working area and/or the travelling plane and/or the ground face.

The wording "the outdoor ground treatment robot seen from above" or "in a direction orthogonal to the working area and/or the travelling plane and/or the ground face" may be used synonymously for the wording "in the plan view of the outdoor ground treatment robot".

The display screen device may, in particular with its display screen face, be nonorthogonal, in particular parallel, to the working area and/or the travelling plane and/or the ground face and/or the contour face. In addition or as an alternative, the display screen device may be electrical. Furthermore in addition or as an alternative, the term "display device" may be used synonymously for the term "display screen device". Furthermore in addition or as an alternative, the display screen device and the cover may be immobile in relation to one another, particularly in translation and/or rotation, and/or arranged, in particular fastened, firmly on one another, particularly in translation and/or rotation.

The display screen face may be on an at least upper-side surface of the outdoor ground treatment robot, in particular the outer contour, in particular the cover. In addition or as an alternative, the size of the display screen face parallel to the working area and/or the travelling plane and/or the ground face and/or the contour face may be at least 5%, in particular at least 7.5%, of the size of the contour face. Furthermore in addition or as an alternative, the size of the display screen face may be at most 100%, in particular at most 50%, in particular at most 25% of the size of the contour face.

The term "value" may be used synonymously for the term "quantity".

In one refinement of the invention, the display screen device comprises at least one light source for generating an optical output in the display screen face. The at least one light source is arranged below the outer contour, in particular the cover. The display screen device defines or comprises the display screen face on an, in particular the at least upper-side surface of the outer contour, in particular of the cover. The outer contour, in particular the cover, is transparent or translucent, in particular at least partially or entirely, at least on the display screen face. This allows the user to be able to perceive the output through the outer contour. In addition or as an alternative, the translucence allows invisibility at least of the light source, particularly in the absence of generation, and/or avoidance of heating and/or UV protection of the display screen device, in particular of the at least one light source, which in particular may respectively be advantageous for robust operation of the display screen device with this size in the open air, generally under direct sunlight. In particular, the generation may be automatic. In addition or as an alternative, the term "visual" may be used synonymously for the term "optical". Furthermore in addition or as an alternative, the term "representation" may be used synonymously for the term "output". Furthermore in addition or as an alternative, the wording "an image" may be used synonymously for the wording "an optical output". Furthermore in addition or as an alternative, the light source may be electrical. Furthermore in addition or as an alternative, the at least one light source may be arranged above the working area and/or the travelling plane and/or the ground face. Furthermore in addition or as an alternative, the at least one light source may be configured to emit at least upwards and/or towards the outer contour, in particular the cover.

In one refinement of the invention, the display screen device comprises at least one, in particular the light source and/or one driver or monitor electronics for generating an, in particular the, optical output in the display screen face. The outdoor ground treatment robot comprises a housing shell. The housing shell and the outer contour, in particular the cover, form, in particular together, a display screen housing. The at least one light source and/or the driver electronics is/are, in particular entirely, arranged or accommodated in an in particular inner compartment of the display screen housing. In particular, the outer contour, in particular the cover, and the housing shell are sealed from one another, in particular by means of a sealing cord. This allows simple and/or good protection of the at least one light source and/or the driver electronics from external environmental influences, in particular dirt and/or water, in particular from outside the compartment or the display screen housing. In particular, the generation may be automatic. In addition or as an alternative, the at least one light source may be electrically driveable or monitorable. Furthermore in addition or as an alternative, the driver electronics may be configured for in particular automatic driving or monitoring of the at least one light source. The at least one light source and/or the driver electronics and/or the housing shell may be arranged below the outer contour, in particular the cover, and/or above the working area and/or the travelling plane and/or the ground face. Furthermore in addition or as an alternative, the term "container" or "trough" may be used synonymously for the term "housing shell". Furthermore in addition or as an alternative, the term "lid" may be used synonymously for the term "outer contour". Furthermore in addition or as an alternative, the outer contour, in particular the cover, and/or the housing shell may be sealed, in particular against water, particularly in a liquid state of matter. Furthermore in addition or as an alternative, the outer contour, in particular the cover, and the housing shell may be sealed from one another against water, particularly in a liquid state of matter. Furthermore in addition or as an alternative, the sealing cord may be an in particular endless circumferential seal.

In one refinement of the invention, the display screen device comprises at least one, in particular the light source and/or one, in particular the driver electronics for generating an, in particular the optical output in the display screen face. The outdoor ground treatment robot comprises a, in particular the, display screen housing and a climate membrane. The at least one light source and/or the driver electronics is/are arranged or accommodated, in particular entirely, in a, in particular the and/or inner compartment of the display screen housing. The climate membrane is permeable for water vapour from the compartment and/or pressure equilibration of the compartment with an ambient atmosphere. This allows on the one hand the aforementioned function/s and on the other hand simple and/or good protection of the at least one light source and/or the driver electronics from water in a liquid state of matter, in particular from outside the compartment or the display screen housing. In particular, the climate membrane may be impermeable or blocking for water in a liquid state of matter into the compartment. In addition or as an alternative, the term "moisture barrier membrane" may be used synonymously for the term "climate membrane". Furthermore in addition or as an alternative, the ambient atmosphere may be an ambient atmosphere outside the compartment or the display screen housing.

In one refinement of the invention, the display screen device defines or comprises the display screen face on an, in particular the, at least upper-side surface of the outer contour, in particular of the cover. The outer contour, in particular the cover, is interface-free along its surface, particularly in all directions, on the display screen face and/or the at least one light source and/or the driver electronics and/or the housing shell and/or the compartment and beyond the display screen face and/or the at least one light source and/or the driver electronics and/or the housing shell and/or the compartment, in particular to at least 1 cm (centimetre), in particular at least 2 cm. This allows simple and/or good sealing of the display screen device, and/or, in particular thus, simple and/or good protection of the display screen device, in particular of the at least one light source and/or of the driver electronics, from environmental influences, in particular dirt and/or water, in particular from outside the compartment or the display screen housing. In particular, the cover may be one piece or single-piece. In addition or as an alternative, the term "interruption-free", "transition-free", "continuous" or "not offset" may be used for the term "interface-free". Furthermore in addition or as an alternative, the outer contour, in particular the cover, may be interface-free as far as its end or edge and/or to at most 50 cm, in particular at most 25 cm, in particular at most 10 cm.

In one refinement of the invention, the outdoor ground treatment robot comprises a heat sink for cooling the display screen device, in particular the at least one light source and/or the driver electronics. The heat sink is arranged below the display screen device. In particular, the heat sink defines or comprises a heat sink face. A size of the heat sink face in the plan view of the outdoor ground treatment robot is or occupies at least 2.5%, in particular at least 5%, in particular at least 7.5%, of the size of the contour face and/or corresponds, in particular is equal, to the size of the display screen face. This allows an in particular passive heat reduction or discharge or dissipation, which may in particular be advantageous for robust operation of the display screen device with this size in the open air, generally under direct sunlight. In particular, the heat sink may be arranged above the working area and/or the travelling plane and/or the ground face. In addition or as an alternative, the size of the heat sink face parallel to the working area and/or the travelling plane and/or the ground face and/or the contour face may be at least 2.5%, in particular at least 5%, in particular at least 7.5%, of the size of the contour face and/or may correspond, in particular be equal, to the size of the display screen face. Furthermore in addition or as an alternative, the size of the heat sink face may be at most 100%, in particular at most 50%, in particular at most 25%, of the size of the contour face. Furthermore in addition or as an alternative, the heat sink may consist at least partially or entirely of aluminium. Furthermore in addition or as an alternative, the housing shell may comprise the heat sink or be formed at least partially, in particular entirely, by the heat sink.

In one refinement of the invention, the outer contour comprises an, in particular the, at least upper-side cover. The outdoor ground treatment robot comprises a, in particular the frame. The cover is mounted movably in relation to the frame, in particular directly. In particular, the outdoor ground treatment robot comprises a movement sensor device. The movement sensor device is configured to detect a cover movement of the cover in relation to the frame or a movement caused by the cover movement. In particular, the heat sink carries a sensor part, in particular a magnet, of the movement sensor device. This makes it possible to detect an obstacle by the cover movement due to the travelling movement, particularly in a travelling direction, and a, in particular direct, touching of the cover by the obstacle. In particular, the frame may comprise at least one driven running wheel and at least one nondriven running wheel for the travelling movement of the outdoor ground treatment robot, in particular over the working area. At least the nondriven running wheel may in particular be arranged at least in front of the driven running wheel in the travelling direction. In addition or as an alternative, the movement sensor device may be electrical. Furthermore in addition or as an alternative, the detection may be automatic. Furthermore in addition or as an alternative, the frame may carry a Hall sensor of the movement sensor device. Furthermore in addition or as an alternative, the outdoor ground treatment robot may comprise an in particular electrical control or monitor device for in particular automatic control or monitoring of a protective function of the outdoor ground treatment robot, triggered by the detected cover movement or the detected movement. This allows control of the protective function upon touching the obstacle. In particular, the outdoor ground treatment robot may comprise an in particular electrical and/or controllable or monitorable tool system. The tool system may comprise a, in particular the processing tool. The control device may be configured for in particular automatic control or monitoring, in particular for deactivation or stopping, of the tool system as the protective function. In addition or as an alternative, the outdoor ground treatment robot may comprise an in particular electrical and/or controllable or monitorable travelling system. The travelling system may comprise the frame. The control device may be configured for in particular automatic control or monitoring, in particular for deactivation or stopping, of the travelling system as the protective function. Furthermore in addition or as an alternative, the movement sensor device and/or the control device may comprise a computer unit, in particular a processor, and/or a memory unit.

In one refinement of the invention, the outdoor ground treatment robot comprises an air cooling circuit for air-cooling the display screen device, in particular the at least one light source and/or the driver electronics. The air cooling circuit extends at least in sections, in particular entirely, below the display screen device, in particular the housing shell and/or the compartment and/or the heat sink. This allows an in particular passive heat reduction or discharge or dissipation, which may in particular be advantageous for robust operation of the display screen device with this size in the open air, generally under direct sunlight. In particular, the air cooling circuit may extend above the working area and/or the travelling plane and/or the ground face. In addition or as an alternative, the heat sink may be arranged at least partially, in particular entirely, in the air cooling circuit in contact with air of the air cooling circuit and/or may be in contact with the display screen device, in particular the at least one light source and/or the driver electronics.

In one configuration of the invention, the outdoor ground treatment robot comprises a, in particular the, frame. The air cooling circuit extends at least in sections, in particular entirely, between the display screen device, in particular the housing shell and/or the compartment and/or the heat sink, and the frame, or is channelled between them. This allows simple and/or good protection of the display screen device, the housing shell, the compartment and/or the heat sink from external environmental influences, in particular dirt and/or water, in particular from below the frame and/or the treatment tool. In particular, the outdoor ground treatment robot, in particular the air cooling circuit, may comprise one air opening in front of, and in particular below, the frame and a further air opening behind, and in particular below, the frame. In particular, the at least upper-side cover may be open downwards.

In one refinement of the invention, the outdoor ground treatment robot comprises a, in particular the, treatment tool. The treatment tool comprises a lawn mowing tool, and in particular is the lawn mowing tool. In addition or as an alternative, the outdoor ground treatment robot is configured as a lawnmower robot. In particular, the lawn mowing tool may be configured for mowing the working area. In addition or as an alternative, the lawn mowing tool may comprise at least one mowing line, at least one plastic blade, at least one metal blade and/or a metal cutting leaf having at least one cutting edge and/or having at least one cutting tooth. Furthermore in addition or as an alternative, the lawnmower robot may be a mulching mower robot.

In one refinement of the invention, the outdoor ground treatment robot comprises a temperature and/or irradiance sensor device. The temperature and/or irradiance sensor device is configured to detect a temperature quantity, in particular a value of the temperature quantity, of the display screen device and/or an irradiance quantity, in particular a value of the irradiance quantity, in an environment, in particular an external environment, of the outdoor ground treatment robot. The display screen device comprises a, in particular the, driver electronics. The driver electronics is configured for driving or monitoring a radiant power, in particular a value of the radiant power, of the display screen device as a function of the detected temperature quantity and/or of the detected irradiance quantity. This allows an adaptive radiant power, particularly in order to increase the radiant power in direct sunlight. In particular, the term "brightness" may be used synonymously for the term "irradiance" or "radiant power". In addition or as an alternative, the temperature and/or irradiance sensor device may be electrical. Furthermore in addition or as an alternative, the detection and/or the driving may be automatic.

In one refinement of the invention, the display screen device is configured for optical output of at least one user-perceptible information item, in particular a content of the information item, relating to at least one state, in particular a value of the state, of the outdoor ground treatment robot. In particular, the term "signal" or "display" may be used synonymously for the term "output".

In one refinement of the invention, the display screen device comprises at least ten by at least ten display screen pixels, in particular respectively by at least three primary colour subpixels and/or arranged in a matrix. This allows the optical output of simple graphics. In particular, the display screen pixels, in particular the primary colour pixels, may be individually driveable or monitorable. In addition or as an alternative, the at least three primary colour subpixels may be red (R), green (G) and blue (B).

In one refinement of the invention, the display screen device comprises at least ten by at least ten light sources for generating an, in particular the, optical output in the display screen face. This allows the optical output of simple graphics. In particular, the light sources may be individually driveable or monitorable and/or electrical. In addition or as an alternative, the at least ten by at least ten light sources may comprise or define a device face, particularly in the plan view of the outdoor ground treatment robot. A size of the device face, particularly in the plan view of the outdoor ground treatment robot, may be or occupy at least 5%, in particular at least 7.5%, of the size of the contour face and/or may correspond, in particular be equal, to the size of the display screen face. In addition or as an alternative, the size of the device face parallel to the working area and/or the travelling plane and/or the ground face and/or the contour face may be at least 5%, in particular at least 7.5%, of the size of the contour face and/or may correspond, in particular be equal, to the size of the display screen face. Furthermore in addition or as an alternative, the size of the device face may be at most 100%, in particular at most 50%, in particular at most 25%, of the size of the contour face.

In one refinement of the invention, the display screen device comprises, in particular the, at least one light source in the form of at least one light-emitting diode, in particular an RGB light-emitting diode for generating an, in particular the optical output in the display screen device.

Other objects, advantages and novel features of the present invention will become apparent from the following detailed description of one or more preferred embodiments when considered in conjunction with the accompanying drawings.

Further advantages and aspects of the invention may be found from the claims and the description of exemplary embodiments of the invention which are explained below with the aid of the figures, in which:

DETAILED DESCRIPTION

Figure 1:
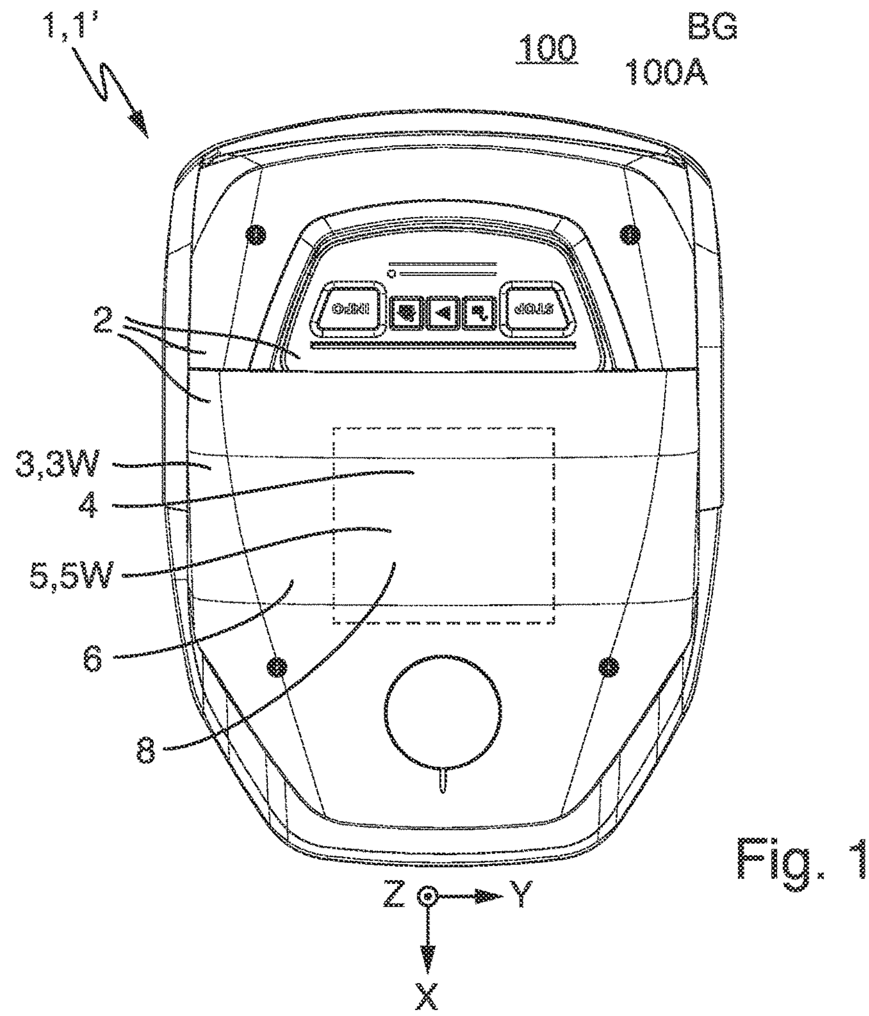
FIG. 1 shows a plan view of an inventive autonomous mobile outdoor ground treatment robot comprising a display screen device made visible.
Figure 2:
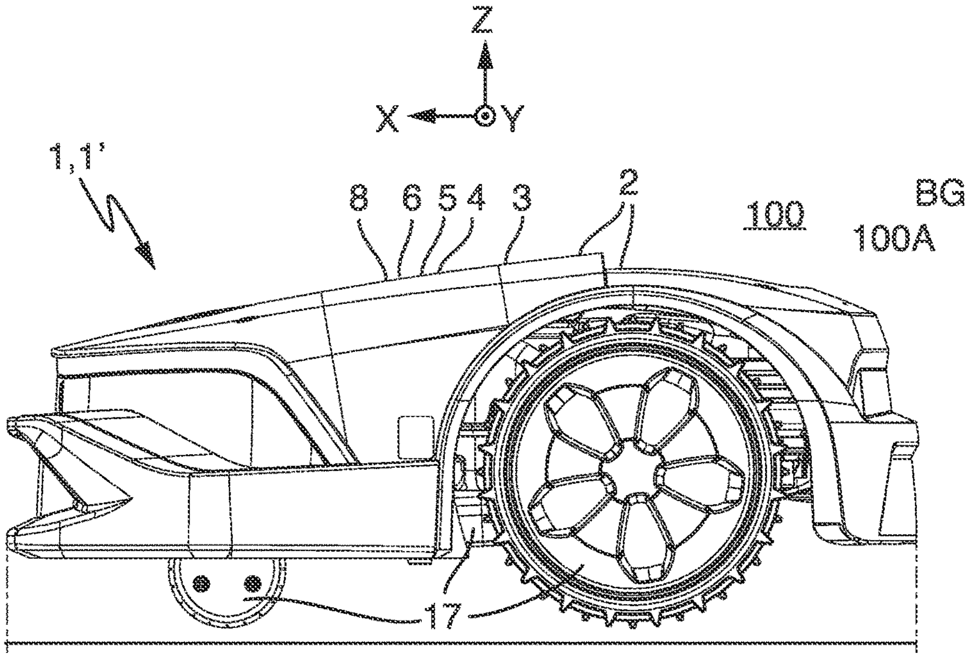
FIG. 2 shows a side view from the left of the outdoor ground treatment robot of FIG. 1.
Figure 7:
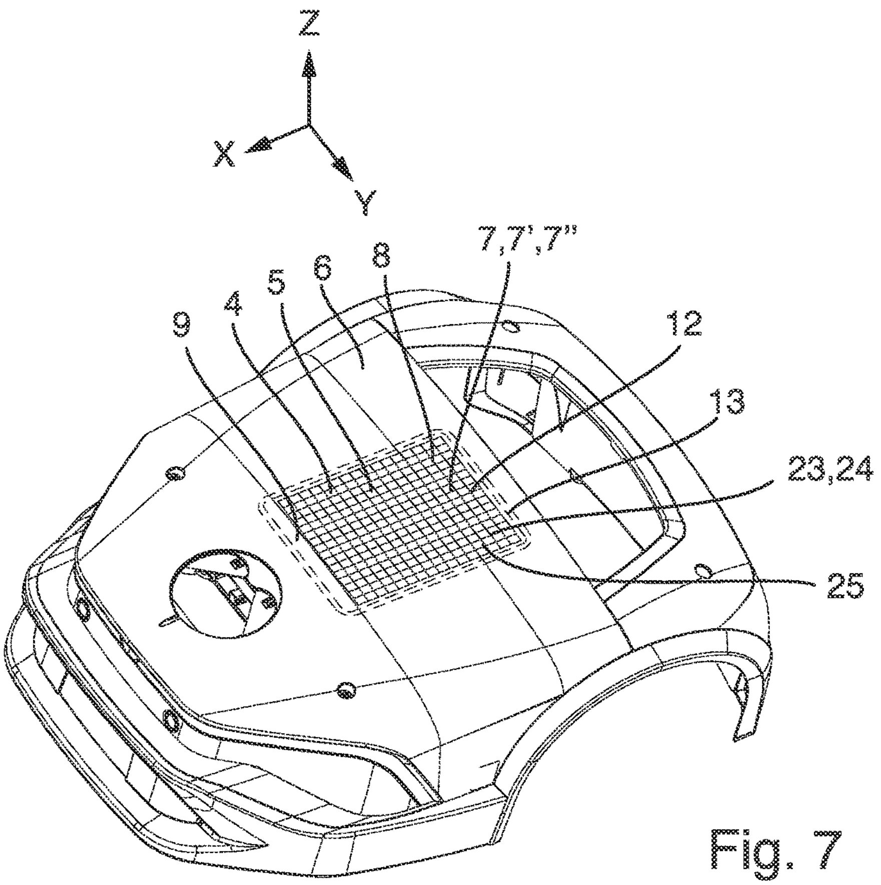
FIG. 7 shows a perspective view from the upper front left of the cover of the outdoor ground treatment robot of FIG. 1 comprising the display screen device made visible.
Figure 8:
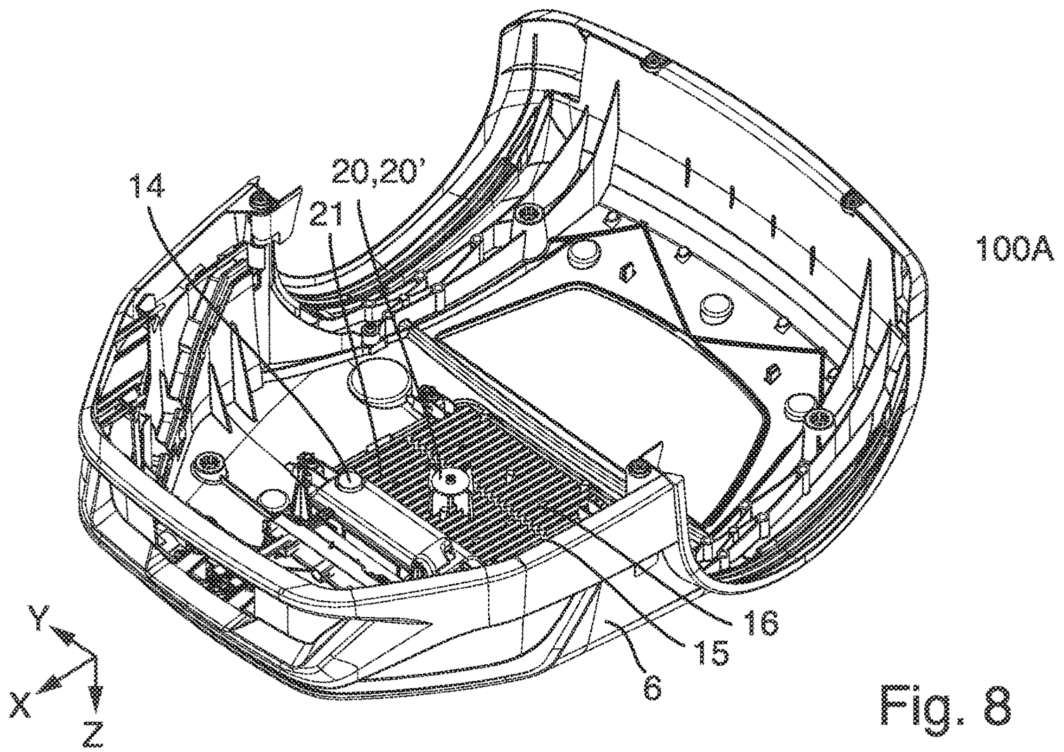
FIG. 8 shows a perspective view from the lower front right inter alia of the cover of the outdoor ground treatment robot of FIG. 1.

FIGS. 1 to 5 and 9 show an autonomous mobile outdoor ground treatment robot 1 according to the invention. The outdoor ground treatment robot 1 comprises an at least upper-side outer contour 2 and a display screen device 4, as shown in FIG. 7. The outer contour 2 comprises a contour face 3, in a plan view of the outdoor ground treatment robot 1, or the outdoor ground treatment robot 1 seen from above or in an in particular vertical z direction orthogonal to a working area and/or a travelling plane and/or a ground face of the outdoor ground treatment robot. The display screen device 4 comprises a display screen face 5. A size 5 W of the display screen face 5 in the plan view of the outdoor ground treatment robot 1 is at least 5%, in the exemplary embodiment shown at least 7.5%, of a size 3 W of the contour face 3, as shown in FIG. 1.

In detail, the display screen device 4 comprises at least one light source 7 for generating, in particular which generates, an optical output BI in the display screen face 5, as shown in FIGS. 7 and 9. The at least one light source 7 is arranged below the outer contour 2, particularly in the z direction. The display screen device 4 comprises the display screen face 5 on an at least upper-side surface 8 of the outer contour 2. The outer contour 2 is translucent in the exemplary embodiment shown, or in alternative exemplary embodiments is transparent, at least on the display screen face 5.

Figure 3:
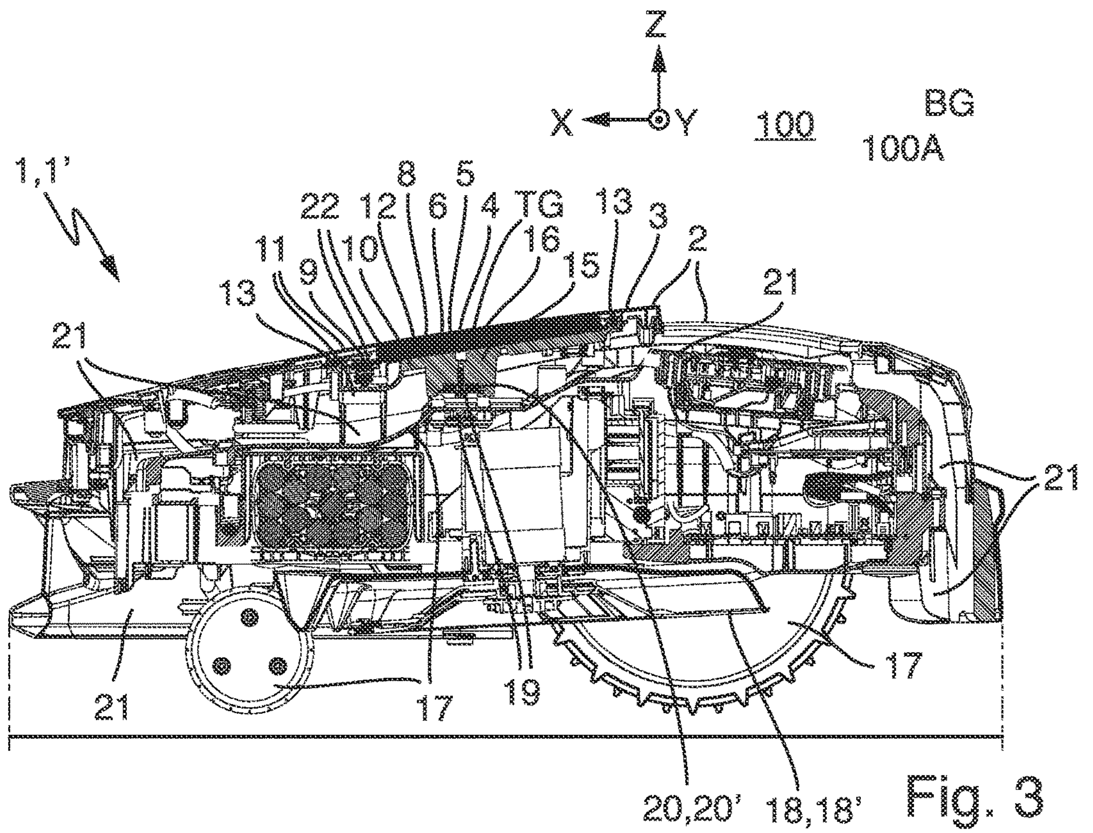
FIG. 3 shows a cutaway side view from the left of the outdoor ground treatment robot of FIG. 1.
Figure 4:
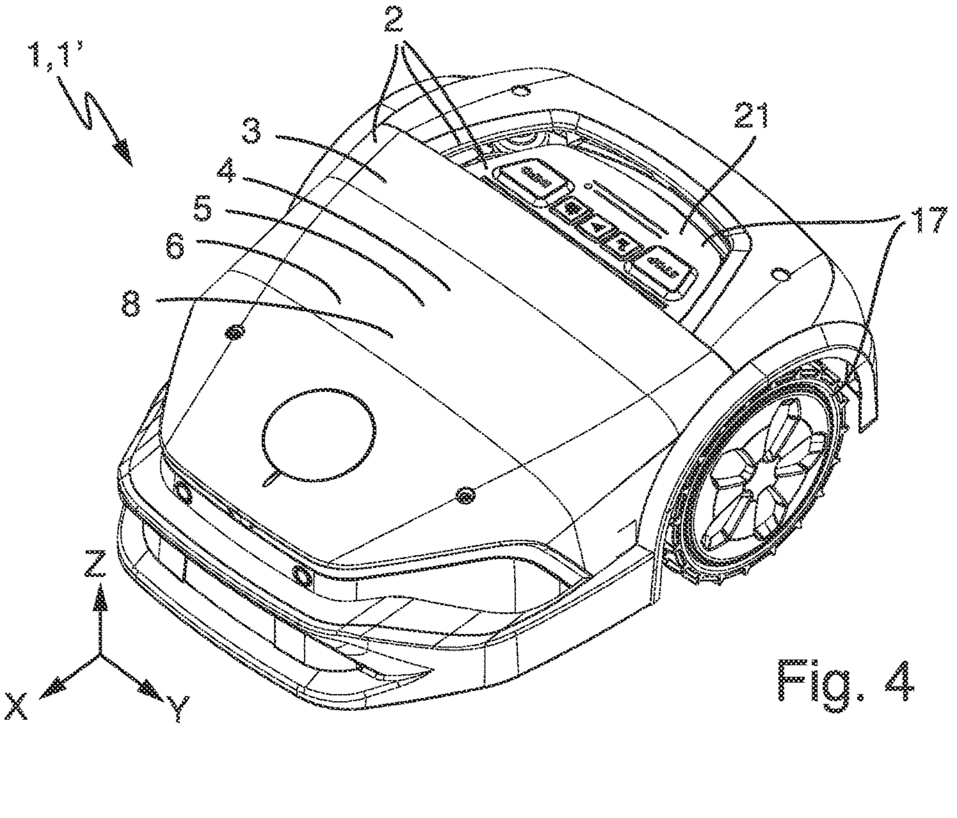
FIG. 4 shows a perspective view from the upper front left of the outdoor ground treatment robot of FIG. 1.
Figure 5:
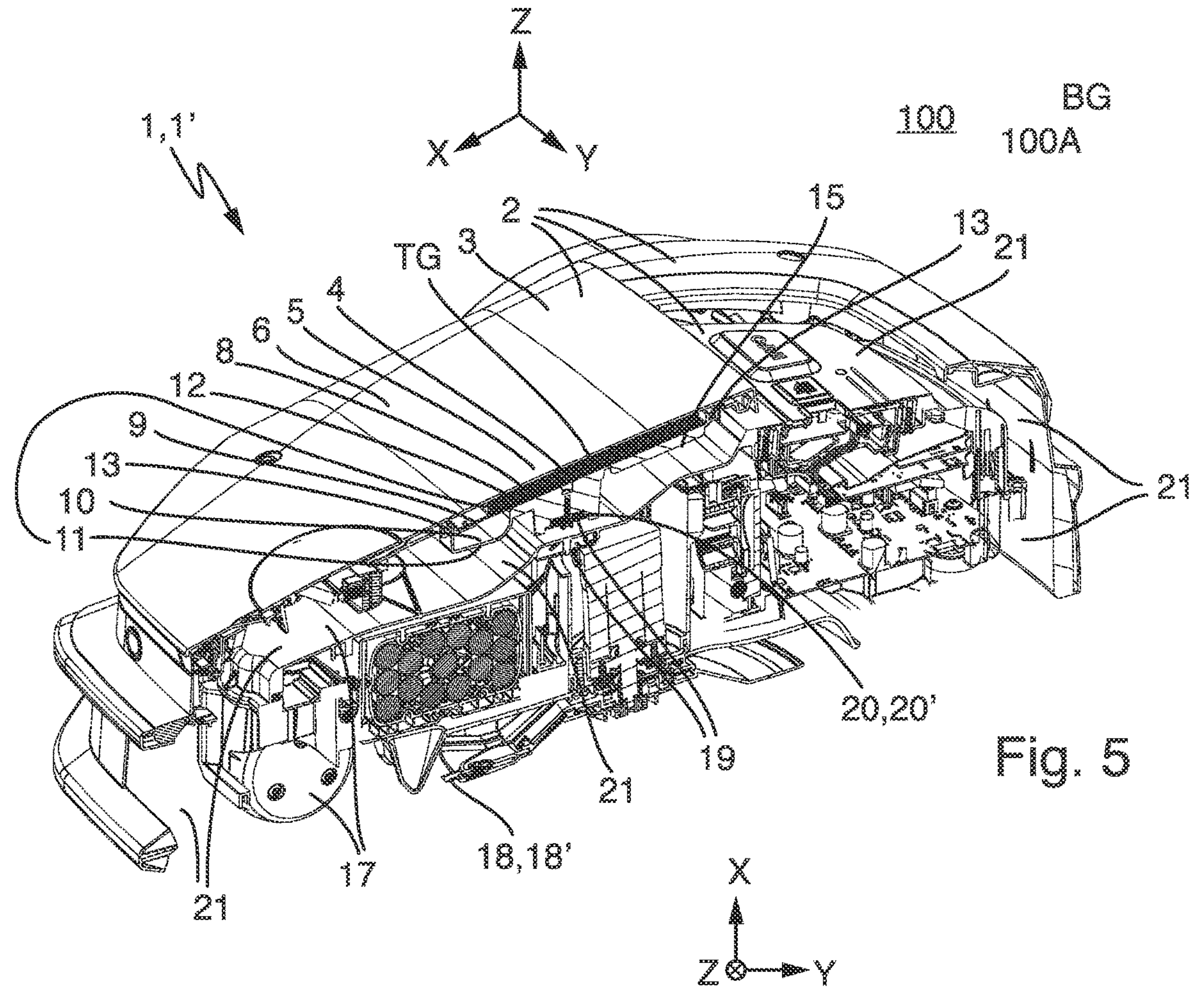
FIG. 5 shows a cutaway perspective view from the upper front left of the outdoor ground treatment robot of FIG. 1.
Figure 6:
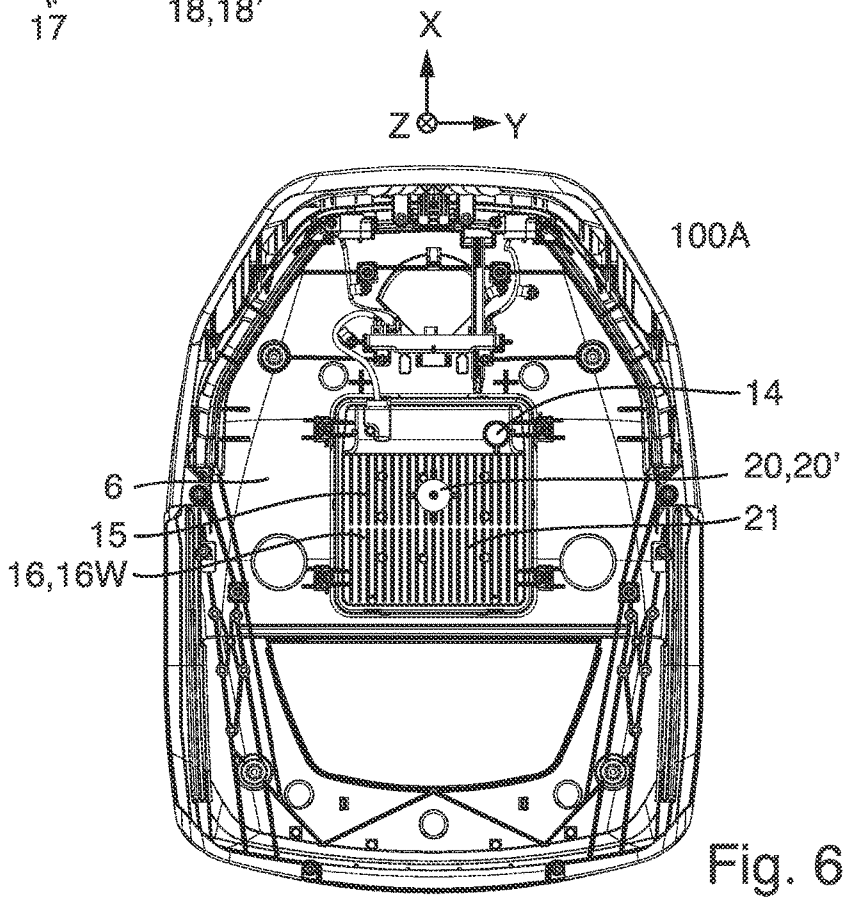
FIG. 6 shows a view from below inter alia of a cover of the outdoor ground treatment robot of FIG. 1.

The display screen device 4 furthermore comprises the at least one light source 7 and/or a driver electronics 9 for generating, in particular which generates/generate, the optical output BI in the display screen face 5, as shown in FIGS. 3, 5 and 7.

In addition, the outdoor ground treatment robot 1 comprises a housing shell 10. The housing shell 10 and the outer contour 2 form a display screen housing 11. The at least one light source 7 and/or the driver electronics 9 is/are arranged in a compartment 12 of the display screen housing 11. In the exemplary embodiment shown, the outer contour 2 and the housing shell 10 are sealed from one another, in the exemplary embodiment shown by means of a sealing cord 13.

In particular, the sealing cord 13 is placed in an in particular endless circumferential groove in the housing shell 10.

In addition or as an alternative, the outdoor ground treatment robot 1 comprises the display screen housing 11 and a climate membrane 14. The at least one light source 7 and/or the driver electronics 9 is/are arranged in the compartment 12 of the display screen housing 11. The climate membrane 14 is permeable for water vapour from the compartment 12 and/or for pressure equilibration of the compartment 12 with an ambient atmosphere 100A.

Furthermore, the display screen device 4 comprises the display screen face on the at least upper-side surface 8 of the outer contour 2. The outer contour 2 is interface-free along its surface 8, particularly in an in particular horizontal x direction and/or an in particular horizontal y direction, in particular each orthogonal to the z direction, on the display screen face 5 and/or the at least one light source 7 and/or the driver electronics 9 and/or the housing shell 10 and/or the compartment 12 and beyond the display screen face 5 and/or the at least one light source 7 and/or the driver electronics 9 and/or the housing shell 10 and/or the compartment 12, in the exemplary embodiment shown to at least 1 cm.

The outdoor ground treatment robot 1 furthermore comprises a heat sink 15 for cooling, in particular which cools, the display screen device 4, in particular the at least one light source 7 and/or the driver electronics 9, as shown in FIGS. 3, 5, 6 and 8. The heat sink 15 is arranged below the display screen device 4, particularly in the z direction. In the exemplary embodiment shown, the heat sink 15 comprises a heat sink face 16. A size 16 W of the heat sink face 16 in the plan view of the outdoor ground treatment robot 1 is at least 2.5%, in particular at least 5%, in the exemplary embodiment shown at least 7.5%, of the size 3 W of the contour face 3 and/or corresponds, in the exemplary embodiment shown is equal, to the size 5 W of the display screen face 5.

Furthermore, the outer contour 2 comprises an at least upper-side cover 6. The outdoor ground treatment robot 1 comprises a frame 17. The cover 6 is mounted movably in relation to the frame 17. In the exemplary embodiment shown, the outdoor ground treatment robot 1 comprises a movement sensor device 19, as shown in FIGS. 3 and 5. The movement sensor device 19 is configured for detecting, in particular detects, a cover movement of the cover 6 in relation to the frame 17 or a movement caused by the cover movement. In the exemplary embodiment shown, the heat sink 15 carries a sensor part 20, in the exemplary embodiment shown a magnet 20', of the movement sensor device 19, as shown in FIGS. 3, 5, 6 and 8.

The outdoor ground treatment robot 1 furthermore comprises an air cooling circuit 21 for air-cooling, in particular which cools, the display screen device 4, in particular the at least one light source 7 and/or the driver electronics 9, as shown in FIGS. 3 to 6 and 8. The air cooling circuit extends at least in sections below, particularly in the z direction, the display screen device 4, in the exemplary embodiment shown the housing shell 10 and/or the compartment 12 and/or the heat sink 15.

In detail, the outdoor ground treatment robot 1 comprises the frame 17. The air cooling circuit 21 extends at least in sections between the display screen device 4, in particular the housing shell 10 and/or the compartment 12 and/or the heat sink 15, and the frame 17.

The outdoor ground treatment robot 1 also comprises a treatment tool 18, as shown in FIGS. 3 and 5. The treatment tool 18 comprises a lawn mowing tool 18'. In addition or as an alternative, the outdoor ground treatment robot 1 is configured as a lawnmower robot 1'.

The outdoor ground treatment robot 1 furthermore comprises a temperature and/or irradiance sensor device 22, as shown in FIGS. 3 and 5. The temperature and/or irradiance sensor device 22 is configured for detecting, in particular detects, a temperature quantity TG of the display screen device 4 and/or an irradiance quantity BG in an environment 100 of the outdoor ground treatment robot 1. The display screen device 4 comprises the driver electronics 9. The driver electronics 9 is configured for driving, in particular drives, a radiant power SL of the display screen device as a function of the detected temperature quantity TG and/or of the detected irradiance quantity BG, as shown in FIG. 9.

Figure 9A:
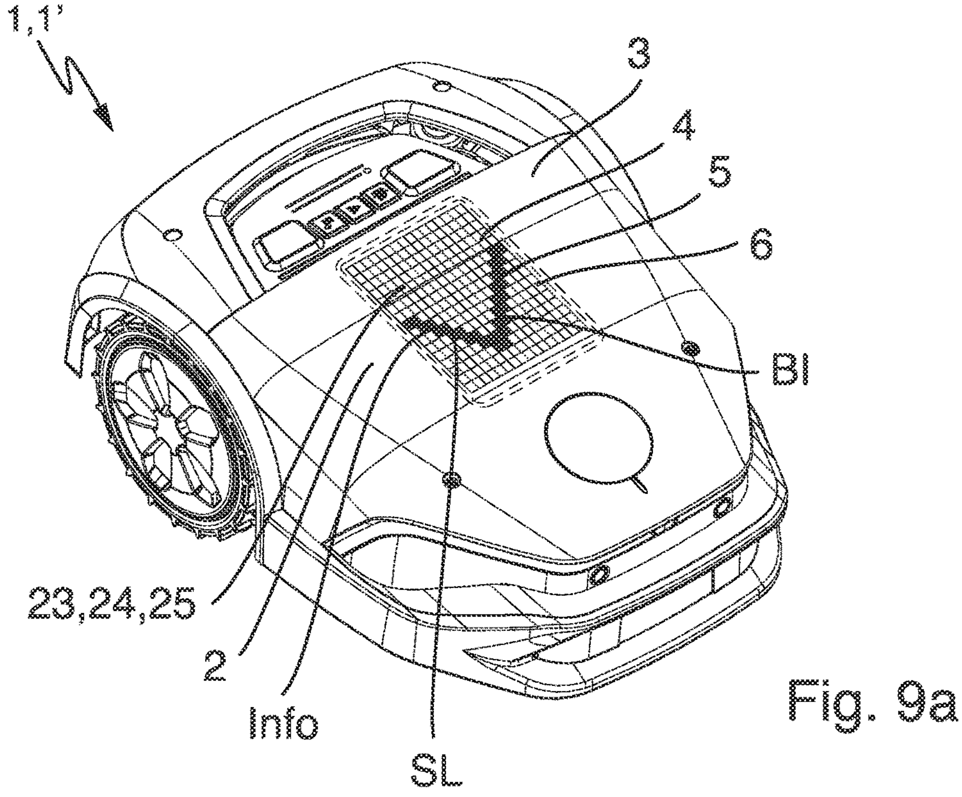
FIG. 9 shows perspective views from the upper front right of the outdoor ground treatment robot of FIG. 1 comprising the display screen device optically outputting various user-perceptible information items relating to various states of the outdoor ground treatment robot.
Figure 9B:
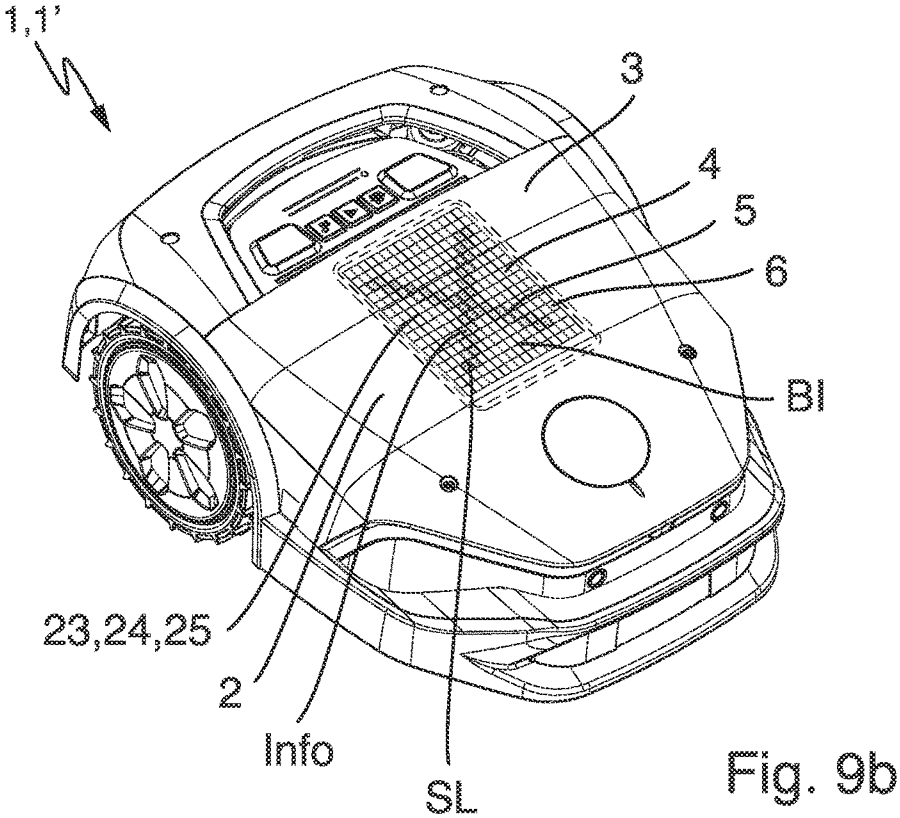

In addition, the display screen device 4 is configured for optically outputting, in particular outputs, at least one user-perceptible information item Info relating to at least one state of the outdoor ground treatment robot 1, for example in FIG. 9*a*) the state "ready for operation" and in FIG. 9*b*) the state "not ready for operation" or "error".

The display screen device 4 furthermore comprises at least ten by at least ten, in the exemplary embodiment shown sixteen by sixteen, display screen pixels 23, in the exemplary embodiment shown by at least three primary colour subpixels 24 and/or arranged in a matrix 25, as shown in FIGS. 7 and 9.

In addition, the display screen device 4 comprises at least ten by at least ten, in the exemplary embodiment shown sixteen by sixteen, light sources 7 for generating the optical output BI in the display screen face 5.

The display screen device 4 furthermore comprises the at least one light source 7 in the form of at least one light-emitting diode 7', in the exemplary embodiment shown an RGB light-emitting diode 7", for generating the optical output BI in the image screen face 5.

The display screen device 4 moreover comprises at least one reflector, in particular for the at least one light source 7.

In addition or as an alternative, the display screen device 4 comprises an in particular flat circuit board, which in particular carries the at least one light source 7 and/or the driver electronics 9.

Furthermore in addition or as an alternative, the display screen device 4 comprises a thermally conductive pad, in particular for the at least one light source 7 and/or the driver electronics 9.

Furthermore in addition or as an alternative, the outdoor ground treatment robot may comprise at least one further display screen device, particularly in the form of a "front stripe" and/or a "back stripe".

Furthermore in addition or as an alternative, the outdoor ground treatment robot may navigate by means of a boundary wire and/or wirelessly, in particular by means of a GNSS.

Furthermore in addition or as an alternative, the outdoor ground treatment robot may comprise a camera device and/or an ultrasound device for detecting an obstacle.

In the exemplary embodiment shown, the contour face 3 is 330 027 $mm^2$ (square millimetres). In addition or as an alternative, the display screen face 5 is 25 077 $mm^2$. Furthermore in addition or as an alternative, the display screen face 5 is at a centre of the contour face 3, in particular closer to the centre than to an end or edge of the contour face 3. Furthermore as an alternative or in addition, the display screen device 4 may be referred to as a central LED matrix.

As the exemplary embodiments shown and explained above make clear, the invention provides an advantageous autonomous mobile outdoor ground treatment robot which has improved properties, and in particular allows a high level of user-friendliness.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An autonomous mobile outdoor ground treatment robot, comprising:

an at least upper-side outer contour, the outer contour comprising a contour face in a plan view of the outdoor ground treatment robot, and a display screen device, the display screen device comprising a display screen face, wherein a size of the display screen face in the plan view of the outdoor ground treatment robot is at least 5% of a size of the contour face, wherein the robot further comprises an air cooling circuit configured to air-cool the display screen device, the air cooling circuit extends at least in sections below the display screen device, the robot further comprises a chassis frame, and the air cooling circuit extends at least in sections between the display screen device and the chassis frame.

2. The robot according to claim 1, wherein the robot further comprises a treatment tool, the treatment tool comprising a lawn mowing tool, and/or the outdoor ground treatment robot is configured as a lawnmower robot.

3. The robot according to claim 1, wherein the robot further comprises: a temperature and/or irradiance sensor device that is configured to detect a temperature quantity of the display screen device and/or an irradiance quantity in an environment of the outdoor ground treatment robot, and the display screen device comprises the driver electronics, and the driver electronics is configured for driving a radiant power of the display screen device as a function of a detected temperature quantity and/or of the detected irradiance quantity.

4. The robot according to claim 1, wherein the display screen device is configured for optical output of at least one user-perceptible information item relating to at least one state of the outdoor ground treatment robot.

5. The robot according to claim 1, wherein the display screen device comprises at least ten by at least ten display screen pixels.

6. The robot according to claim 1, wherein the display screen device comprises at least ten by at least ten light sources configured to generate an optical output in the display screen face.

7. The robot according to claim 1, wherein the display screen device comprises at least one light source in the form of at least one light-emitting diode, configured to generate an optical output in the display screen face.

8. The robot according to claim 1, wherein the air cooling circuit is configured to air-cool at least one light source and/or a driver electronics.

9. The robot according to claim 1, wherein the air cooling circuit extends at least in sections below a housing shell and/or a compartment and/or a heat sink.

10. The robot according to claim 1, wherein the air cooling circuit extends at least in sections between the display screen device, including a housing shell and/or a compartment and/or a heat sink, and the chassis frame.

11. The robot according to claim 5, wherein the display screen pixels comprise at least three primary color subpixels and/or are arranged in a matrix.

12. The robot according to claim 7, wherein the light-emitting diode is an RGB light-emitting diode.

* * * * *